(12) United States Patent
Zandi

(10) Patent No.: US 12,411,281 B2
(45) Date of Patent: Sep. 9, 2025

(54) INTERFEROMETRIC INTEGRATED OPTICAL GYROSCOPES

(71) Applicant: OSCPS MOTION SENSING INC., Montreal (CA)

(72) Inventor: Kazem Zandi, Montreal (CA)

(73) Assignee: OSCPS MOTION SENSING INC., Montreal (CA)

(*) Notice: Subject to any disclaimer, the term of this patent is extended or adjusted under 35 U.S.C. 154(b) by 310 days.

(21) Appl. No.: 18/110,989

(22) Filed: Feb. 17, 2023

(65) Prior Publication Data
US 2023/0258863 A1 Aug. 17, 2023

Related U.S. Application Data

(60) Provisional application No. 63/311,267, filed on Feb. 17, 2022.

(51) Int. Cl.
G02B 6/122 (2006.01)
G01C 19/64 (2006.01)
G02B 6/136 (2006.01)
G02B 6/12 (2006.01)

(52) U.S. Cl.
CPC ............ G02B 6/122 (2013.01); G01C 19/64 (2013.01); G02B 6/136 (2013.01); G02B 2006/12169 (2013.01)

(58) Field of Classification Search
CPC .................. G02B 6/29347; G01C 19/64
See application file for complete search history.

(56) References Cited

U.S. PATENT DOCUMENTS

2021/0140768 A1* 5/2021 Paniccia ............ G02B 6/12007

* cited by examiner

Primary Examiner — Chad H Smith
(74) Attorney, Agent, or Firm — BCF LLP

(57) ABSTRACT

An optical waveguide structure for an optical gyroscope, the structure including a substrate; at least a first silicon nitride waveguide loop and a second silicon nitride waveguide loop connected to the substrate, the first silicon nitride waveguide loop and the second silicon nitride waveguide being disposed at different vertical distances from the substrate; at least one vertical coupler optically coupling the first silicon nitride waveguide loop to the second silicon nitride waveguide; and a plurality of air cavities defined in material below the first and second silicon nitride waveguide loops, no air cavities being defined in regions immediately below a coupling region defined around the at least one vertical coupler.

10 Claims, 11 Drawing Sheets

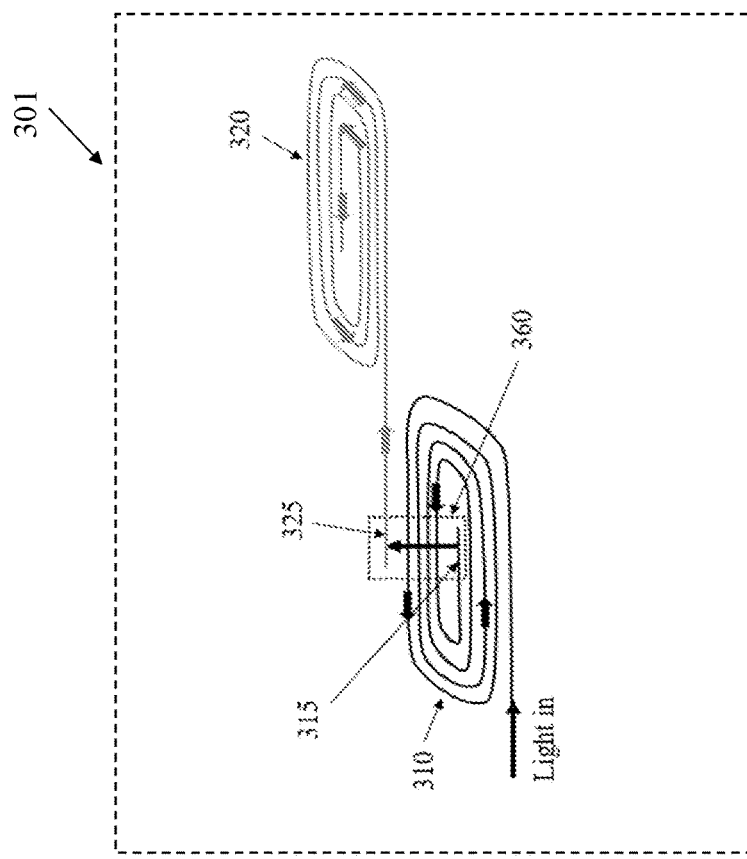
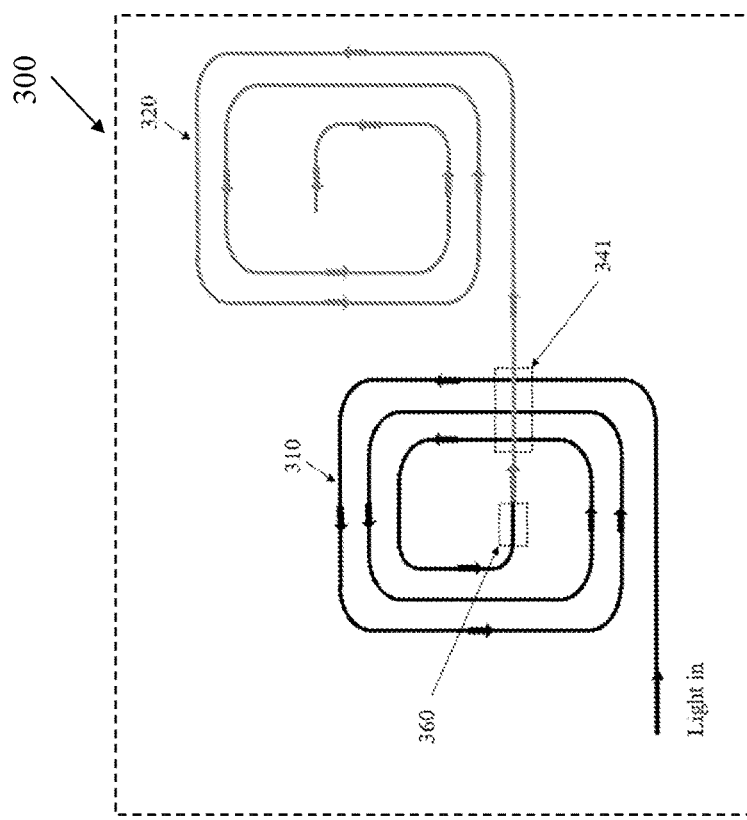
Fig. 3(b)
Fig. 3(a)

INTERFEROMETRIC INTEGRATED OPTICAL GYROSCOPES

CROSS-REFERENCE

The present application claims priority to United States Provisional Patent Application No. 63/311,267, entitled "Interferometric Fiber Optic Gyroscopes", filed on Feb. 17, 2022, the entirety of which is incorporated by reference herein.

TECHNICAL FIELD

The present technology generally relates to gyroscopes.

BACKGROUND

As remote controlled and unmanned vehicles (such as drones and autonomous vehicles) become more common, there is increasing interest in gyroscopes as sensors for measuring angular rotation. One type of gyroscope in the field of measuring angular velocity is optical gyroscopes, where the effect of rotation on light signals are monitored to detect rotational speed of an apparatus. In such devices, a light phase shift due to Sagnac effect is used to measure angular velocity.

Optical gyroscopes, for instance optical ring resonator-based optical gyroscopes, use optical elements, such as a laser, beam splitters, polarizers, phase modulators, circulators, resonators, and photodetectors. In order to provide accurate measurements, the various optical elements need to be precisely and stably aligned. In some cases, this can require bulky mechanical supports in order to precisely and reliably align the different optical elements.

Optical gyroscopes also require electrical or electronic elements, such as wave generators, lock-in amplifiers, FPGA, and computer-implemented devices. These elements can be bulky, and the size of the different optical and electrical elements limit how small a gyroscope can be made. For many applications such as drones, however, smaller gyroscopes could be preferable (or necessary). All of the components, both optical and electrical/electronic, further require electrical connections to be made between the components.

There thus remains a desire for a gyroscope that overcomes at least some of these inconveniences.

SUMMARY

It is an object of the present technology to ameliorate at least some of the inconveniences present in the prior art.

The present application relates to interferometric integrated optic gyroscopes utilizing vertically stacked multiple coils of silicon nitride waveguides with etched cavities underneath the bottom cladding.

According to non-limiting embodiments of the present technology, there is provided an optical waveguide structure for an optical gyroscope, the structure comprising a substrate; at least a first silicon nitride waveguide loop and a second silicon nitride waveguide loop connected to the substrate, the first silicon nitride waveguide loop and the second silicon nitride waveguide being disposed at different vertical distances from the substrate; at least one vertical coupler optically coupling the first silicon nitride waveguide loop to the second silicon nitride waveguide; and a plurality of air cavities defined in material below the first and second silicon nitride waveguide loops, no air cavities being defined in regions immediately below a coupling region defined around the at least one vertical coupler.

In some embodiments, for the first and second silicon nitride waveguide loops having an about 2.8 um width and an about 100 nm thickness, the first and second silicon nitride waveguide loops are vertically separated by about 1.95 um.

In some embodiments, the structure further includes a third silicon nitride waveguide loop connected to the substrate; and the first, second, and third silicon nitride waveguide loops are shifted laterally relative to one another to limit vertical coupling outside the coupling region.

According to non-limiting embodiments of the present technology, there is provided a method for fabricating an optical waveguide structure for an optical gyroscope, the method comprising: embedding at least one silicon pocket into an oxide substrate; forming at least one silicon nitride loop on the oxide substrate, at least one layer of oxide cladding being disposed between the at least one silicon pocket and the at least one silicon nitride loop; and etching, using XeF2 gas, the at least one silicon pocket to form at least one cavity between the at least one silicon nitride loop and the oxide substrate.

In some embodiments, etching the at least one silicon pocket comprises simultaneously etching through a plurality of layers of silicon deposited on the oxide substrate.

According to non-limiting embodiments of the present technology, there is provided a method for fabricating an optical waveguide structure, the method comprising: depositing at least one oxide layer on a substrate; embedding at least one silicon pocket in the at least one oxide layer; forming at least one silicon nitride loop on the oxide substrate, at least one layer of oxide cladding being disposed between the at least one silicon pocket and the at least one silicon nitride loop; depositing and patterning a layer of photoresist over the at least silicon nitride loop; and etching, via the photoresist, the at least one silicon pocket to form at least one cavity between the substrate and the at least one silicon nitride loop.

In some embodiments, etching, via the photoresist, comprises etching a plurality of openings through at least the at least one oxide cladding layer.

In some embodiments, the method further includes depositing at least one cladding overlayer over the at least one silicon nitride loop, the at least one cladding overlayer covering the plurality of openings.

In some embodiments, etching the at least one cavity includes etching using XeF2.

In some embodiments, the method further includes a first annealing at 1200 degree Celsius; chemical mechanical polishing subsequent to the first annealing; and a second annealing subsequent to the chemical mechanical polishing.

According to non-limiting embodiments of the present technology, there is provided integrated optic vertical couplers stacked on each other with multiple silicon nitride waveguide loops and air cavities below the waveguide loops except in the coupling regions.

In some embodiments, a vertical distance between the surfaces of silicon nitride waveguide loops is 1.95 um for 2.8 um wide and 100 nm thickness silicon nitride waveguides.

In some embodiments, loops are stacked alternatively on each other and shifted transversely so that not to allow vertical coupling between the adjacent loop waveguides, other than the designed coupling regions.

In some embodiments, Silicon layers are embedded into oxide below silicon nitride waveguide loops, except in the vertical coupling regions, with oxide cladding in between and then etching away Silicon through XeF2 gas to create air underneath.

In some embodiments, patterning silicon nitride loops and then embedding Silicon layers into oxide below silicon nitride is done in such a way that at the end of fabrication entire stacks of Silicon are etched away at the same time by creating VIA (through passages) through entire stacks. In at least some cases, this fabrication saves cost and time of fabrication of VIA. In some embodiments, loops with thinner bottom oxide cladding can also be used, while simultaneously avoiding coupling of light between loops in unwanted areas. This is especially important if the shape of one or more loops is not rectangular, such as with circular loops.

The terms "photonic integrated circuit chip," "PIC chip," "chip for an optical gyroscope," and "chip" are used herein interchangeably. As used herein, the term "immovably attached" refers to an attachment in a manner that cannot be readily detached during use, for example, a chemical attachment using deposition techniques or adhesive.

The term "deposit" in reference to fabrications methods, as used herein, refers broadly to methods and processes of mechanically and/or chemically applying a material to one or more desired locations, or as a layer, on a surface. The methods and processes encompassed by the term "deposit" herein include but are not limited to: spin-coating, photoresist development and etching, photolithography, electron-beam lithography, thermal oxidation, plasma etching, low pressure chemical vapor deposition, plasma enhanced chemical vapor deposition, and physical vapor deposition.

Directions or orientations used herein, such as above, below, left and right, refer to relative positioning of components of the gyroscope as seen from a plan, overhead view of the components with light input being arranged at the "bottom" and light detection being arranged at the "top", except where otherwise noted. Components of the gyroscope, when described separately from the gyroscope, maintain the same descriptive orientation as it would have when installed on the gyroscope. It is noted that these relative directions are used for simplicity of description only, and the gyroscope and components thereof are contemplated to be used in any number of orientations.

Implementations of the present disclosure each have at least one of the above-mentioned objects and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3(a) is a top view of two loops of the interferometric integrated optic gyroscope of FIG. 8.

FIG. 3(b) is a perspective view of two loops of the interferometric integrated optic gyroscope of FIG. 8;

Figure 1:
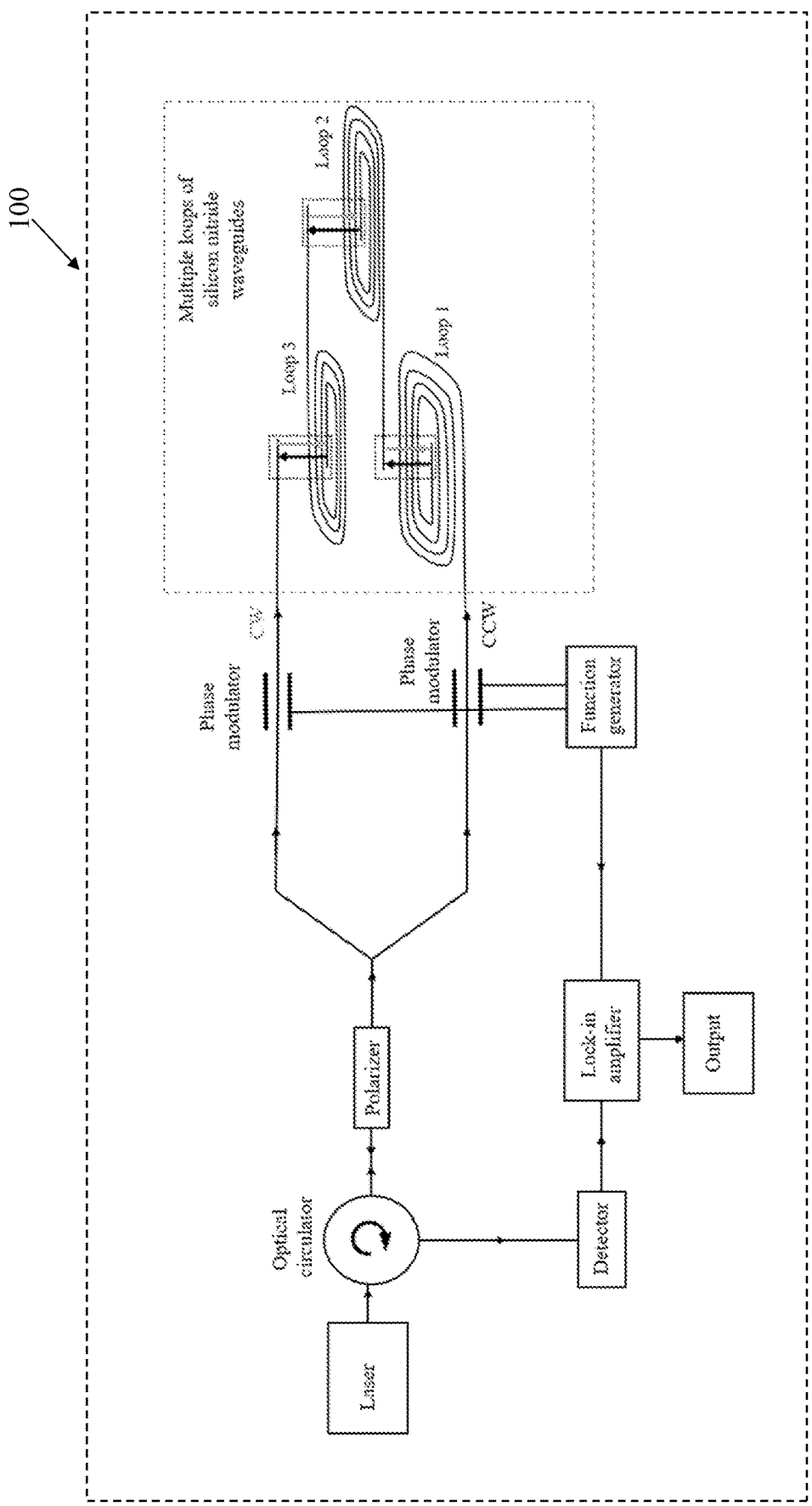
FIG. 1 is a top plan view schematic diagram of an interferometric integrated optic gyroscope with multiple loops.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims. It should be noted that the Figures may not be drawn to scale, except where otherwise noted.

DETAILED DESCRIPTION

The present disclosure is directed to systems, methods and apparatuses to address the deficiencies of the current state of the art.

With reference to FIG. 1, a multiple loop of an interferometric integrated optic gyroscope 100 according to the present technology is illustrated. The gyroscope 100 includes an optical arrangement structure for vertical coupling between waveguide loops, described in more detail below.

The illustrated apparatus 100 is a passive integrated optic interferometer where the waveguide optic coupler is employed to split the radiation from the light source into two counterpropagating waves, clockwise (CW) and counterclockwise (CCW), in the optical waveguide coil and to recombine the waves, after propagation, on a photodetector (PD).

The phase difference, between the two counterpropagating waves, is thus cumulated over a long optical waveguide coil (also referred to as loops) in order to obtain high responsivity with a compact device. For ideal integrated optic waveguides and components, the output photogenerated current I can be described by the expressions:

$$I_1 = I_{01}(1 - \cos \varphi_s),  \quad \text{Eq. (1)}$$

$$I_2 = I_{02}(1 + \cos \varphi_s), \text{ and} \quad \text{Eq. (2)}$$

$$I_0 = \sigma P/2, \quad \text{Eq. (3)}$$

where $\varphi_s$ is the so-called Sagnac phase shift, $\sigma$ is the photodetector responsivity and P is the power coupled into the input integrated optic waveguide.

The Sagnac phase shift $\varphi_s$ is the phase shift difference between two counterpropagating waves along the same optical path, and is described by the expression:

$$\varphi_s = \frac{8\pi AN}{\lambda c} \cdot \Omega, \quad \text{Eq. (4)}$$

where $\Omega$ is the angular velocity, $\lambda$ is the vacuum wavelength, N is the number of loops of the integrated optic waveguide-coil, and A is the area enclosed by each integrated optic loop.

In view of these calculations, it can be seen that increasing the area A and longer length (through the number of loops N) enhances the Sagnac phase shift. The greater Sagnac shift thus leads to the ability to detect smaller rotations.

With reference to FIGS. 2(a), 2(b) and 3(a), 3(b) and 3(c), one non-limiting embodiment of the present technology is illustrated. According to at least embodiments, at least a portion of the optical waveguide length of the coil is created on a silicon nitride layer, see FIG. 3(c), in order to miniaturize the waveguide coil on a chip.

Figure 2B:
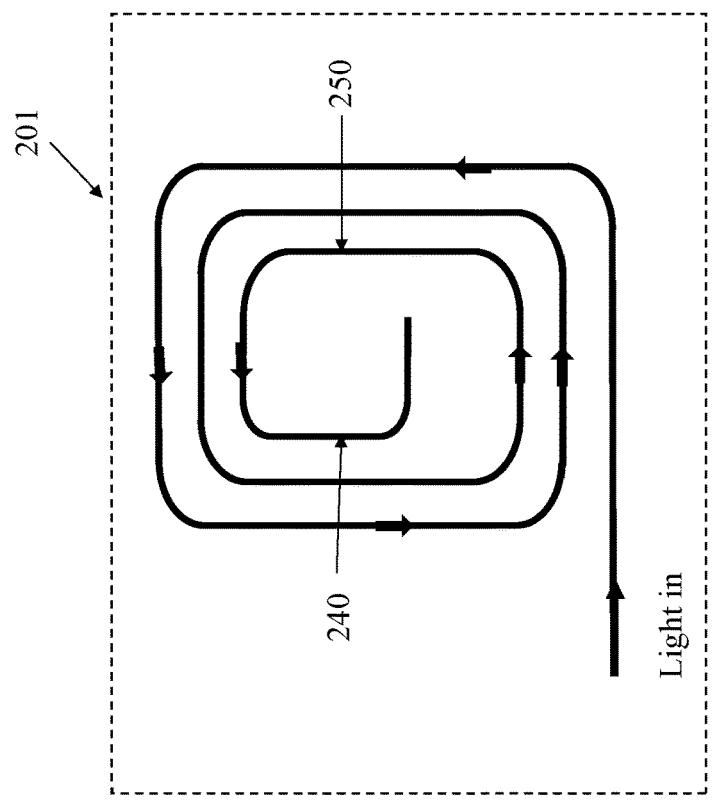
FIG. 2(b) is the top view of first loop of an interferometric integrated optic gyroscope according to a non-limiting embodiment of the present technology shown in FIG. 8.
Figure 2A:
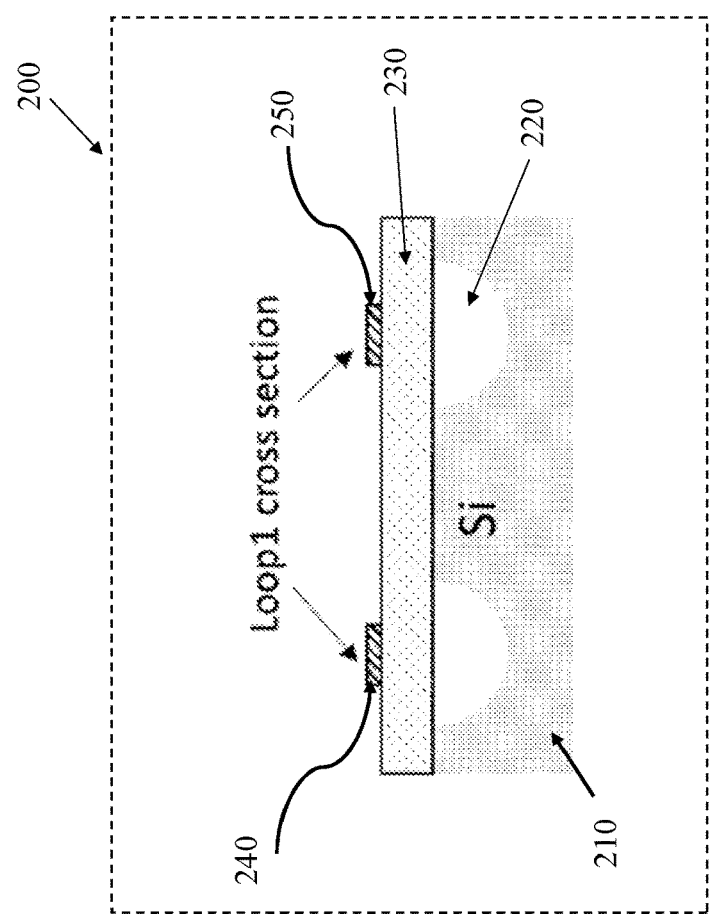
FIG. 2(a) is a first loop of an interferometric integrated optic gyroscope according to a non-limiting embodiment of the present technology shown in FIG. 8.

In order to generate sufficient Sagnac phase shift to detect a desired magnitude rotation, there will be a minimum length of waveguide forming the loops. As one non-limiting illustrative example, 100 meters of length of waveguide could be required to generate sufficient Sagnac phase shift to be able to detect rotations as small as 2.8°/h. A first 5 meters of loop could be formed, of silicon nitride, in a first layer out in a spiral shape. This can be referred to as loop 1 as identified in FIG. 8. This loop 1 cross section is also shown in FIGS. 2(a) and 2(b). The silicon nitride loop 1 stands on 2-micron bottom oxide with air created in Silicon substrate underneath via processing previously described.

With reference to FIG. 2(a), the structure 200 is shown at a first fabrication step. A cladding layer 230 is deposited on a silicon substrate 210. In the present embodiment, the cladding layer 230 is a 2 μm oxide layer. Depending upon thickness used and method of deposition, this could be single- or double-sided oxide, where the silicon substrate 210 could have a layer of oxide deposited on parallel surfaces. In the non-limiting example, two air cavities 220 are defined in the Si substrate 210. The cavities 220 improve propagation efficiency through the layer 230, by increasing the difference of effective index between the layer 230 and the cavity 220.

With reference to FIGS. 2(a) and 2(b), a single loop 201 is deposited on the layer 230 (two portions of the inner loop 240 and 250 of FIG. 2(b), being illustrated in cross-section of FIG. 2(a) again as 240 and 250 and with the label "Loop 1 cross section"). Specifically, in structure 200, silicon nitride is deposited and patterned as shown by 240 and 250, on the oxide layer 230 and then etched to form the ring loop 201 of FIG. 2(b).

Figure 3C:
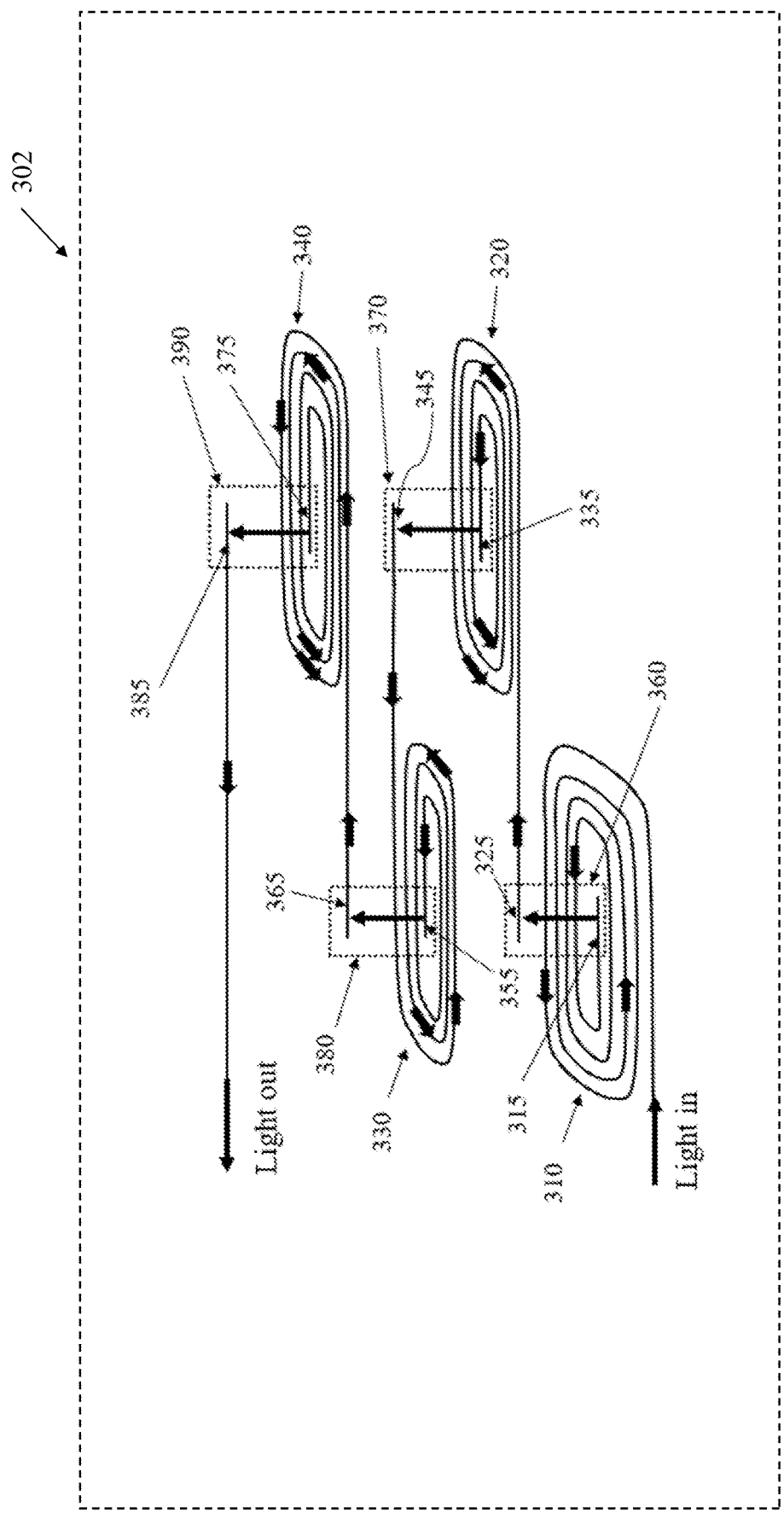
FIG. 3(c) is a perspective view of four loops of the interferometric integrated optic gyroscope of FIG. 8.
Figure 8:
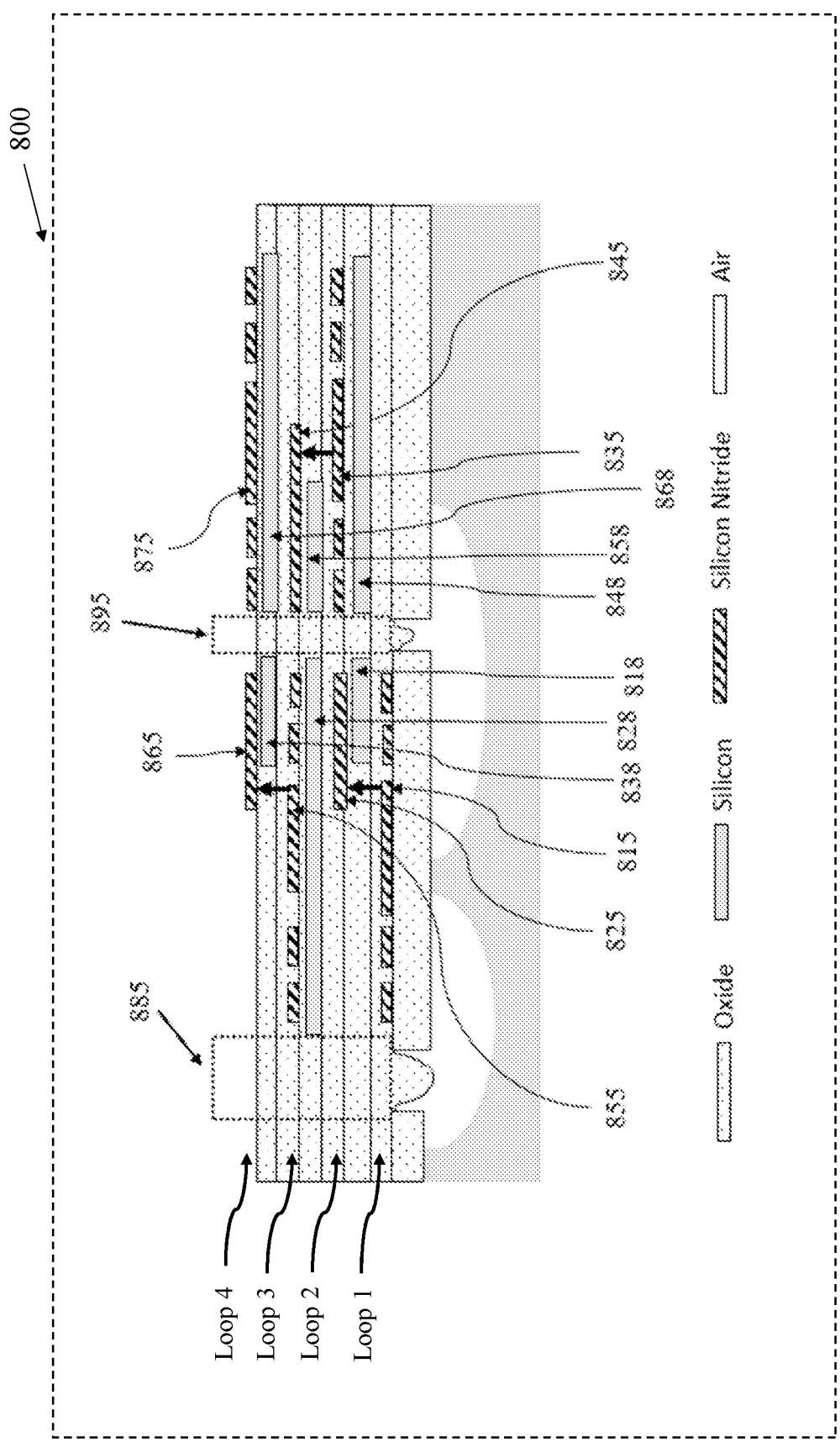
FIG. 8 is a cross-section view of the total the interferometric integrated optic gyroscope of FIG. 3(c), prior to final etching.

With reference to FIGS. 3(a), 3(b) and 8, a top oxide cladding, for instance of a thickness of 1.95 micron, is deposited over loop 1. On the top oxide cladding, another layer of silicon nitride is deposited to form another loop, referred to as loop 2 in FIGS. 8 and 320 in FIGS. 3(a), 3(b) and 3(c). The loop 2 is shifted positionally in transverse direction in respect to loop 1. This is because it is sometimes preferable to use a relatively thin oxide layer (for example 1.95 micron). At such a thickness, there is not sufficient distance and/or material to prevent coupling of light propagating through loop 1 into loop 2 if the loops 1,2 were positioned and aligned on top of each other. Thus, this shift aids in preventing interaction between light propagating inside the waveguides of loop 1 and loop 2.

In order to form the full length of the "loop" of the interferometer, light does need to couple from the end of loop 1 into an and of the loop 2. A portion of the waveguide of loop 2 is thus extended over loop 1, as is illustrated in FIGS. 3(a), 3(b) and 3(c). The coupling occurs in the region indicated by a dashed rectangular shape (360) in FIG. 3(a), (370) in FIG. 3(b) and (360) in FIG. 3(c). The above-described arrangement of sequential loops is thus repeated for additional loops 3, 4, and so on until the total 100 meters length is achieved.

According to the present technology, the shape of loop 1 is designed such that the portion of the waveguide of loop 2 extending over the loop 1 is perpendicular to crossing waveguides, as is illustrated in FIG. 3(a) in the dashed rectangles 341. A portion of the waveguide of loop 2 is also in parallel to the coupling region waveguide of loop 1 as shown by dashed rectangular shapes (360) in FIG. 3(a), FIG. 3(b) and FIG. 3(c), in order to allow coupling. Light injected by a laser source into loop 1 will thus be coupled to loop 2 vertically in the coupling region but will not couple back to loop 1 on the crossing area 341 as waveguides are perpendicular. As can be seen from the following expression of coupling because two lights are propagating perpendicularly, $$\vec{k}_1 \cdot \vec{k}_2 = 0, \quad \text{Eq. (5)}$$

where $k_1$ and $k_2$ are the wave number of light propagating in loops 1 and 2 respectively in crossing region 341. In contrast, in the coupling region where both waveguides are parallel, 99.34% of lights gets coupled from loop 1 into loop 2, as can be seen from the simulation 400 illustrated in FIG. 4.

Figure 5:
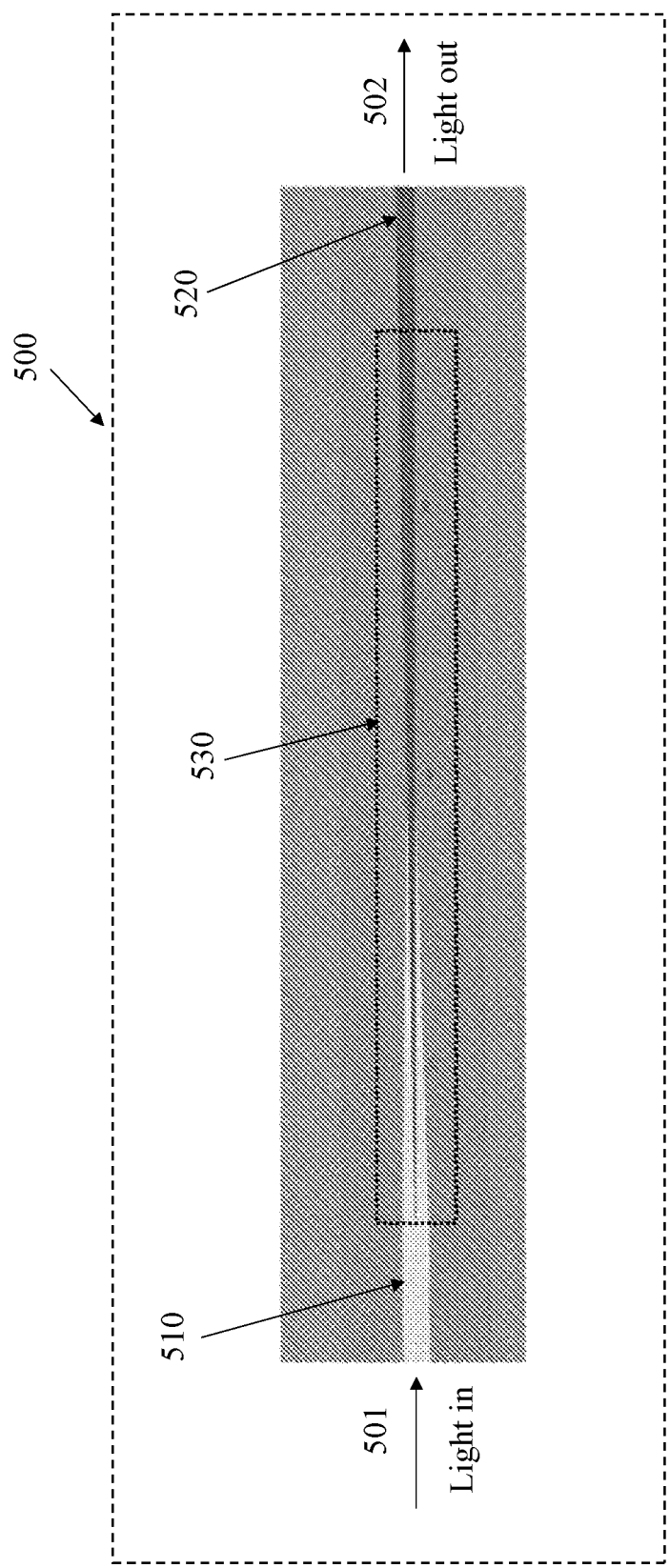
FIG. 5 is a top view of two vertically tapered waveguides of the vertical couplers of FIG. 8, positioned on top of each other with an oxide layer therebetween of the interferometric integrated optic gyroscope of FIG. 8.
Figure 6:
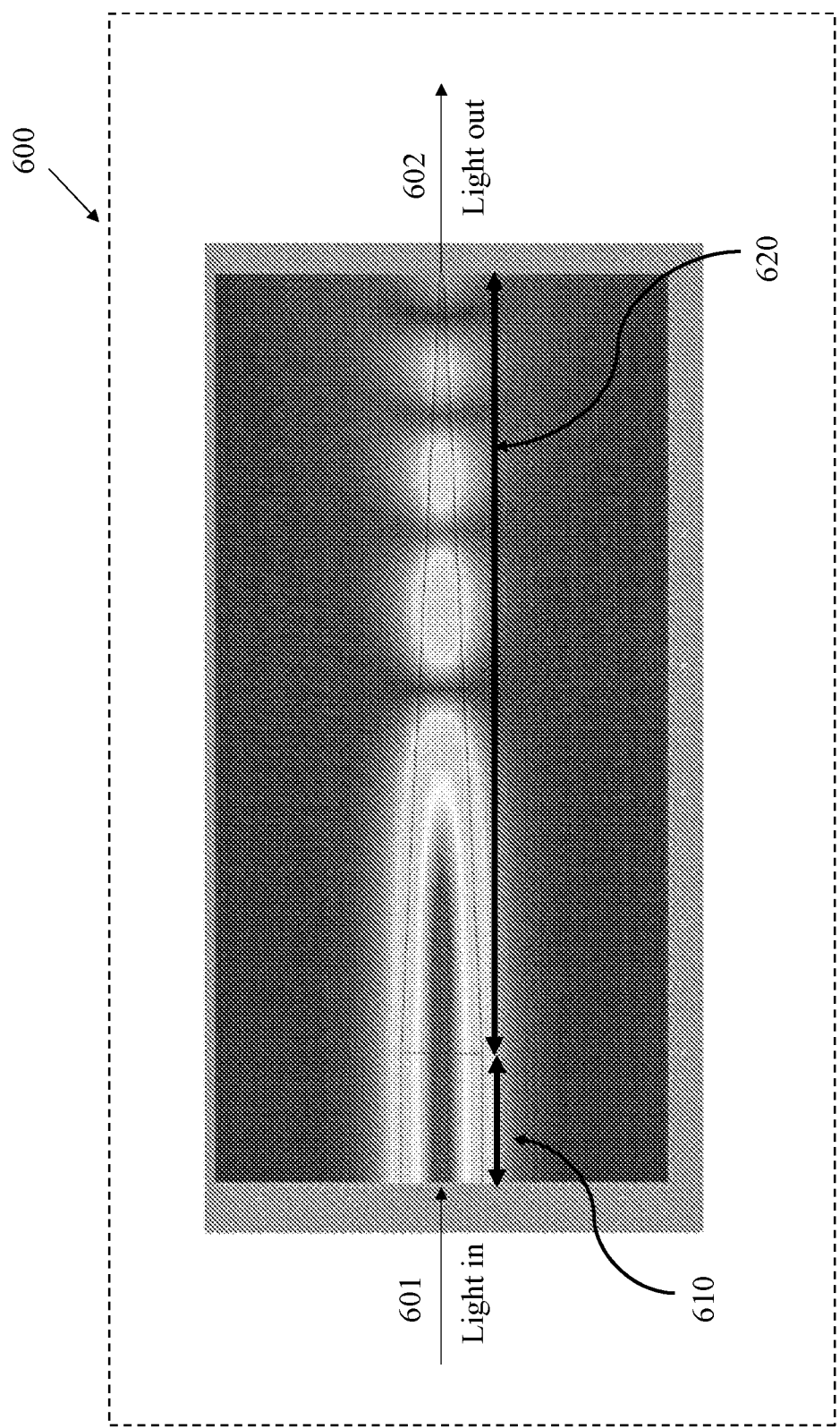
FIG. 6 is a simulation of a mode propagating inside a tapered portion of one of the tapered waveguides of the interferometric integrated optic gyroscope of FIG. 8.
Figure 7:
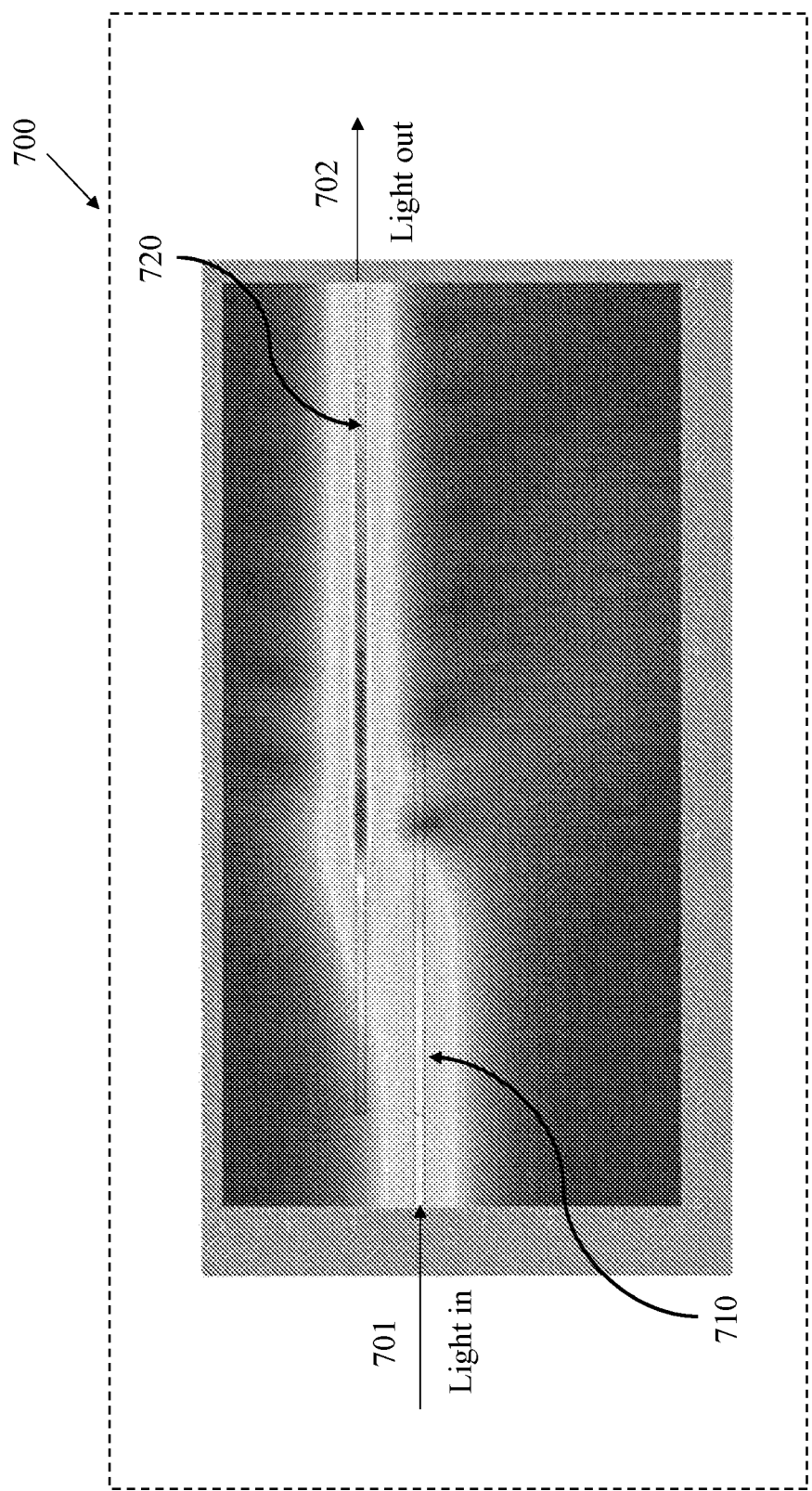
FIG. 7 is a simulation of light in a tapered bottom waveguide coupling to a top tapered waveguide portion of the interferometric integrated optic gyroscope of FIG. 8, light propagating from left to right and illustrating how light is coupled from a bottom tapered waveguide to a top tapered waveguide.

The waveguides end in the coupling regions can be tapered in at least some embodiments such that less coupling length is required, see for instance the simulations illustrated in FIGS. 5 to 7. This effect is due at least in part to the increasing mode size of light propagating through a tapered region of a waveguide.

In order to minimize the bend loss, the corners of loops having rectangular shape are rounded with at least a 2 mm bend radius when a nitride layer thickness of 40 nm is used. In some cases, the bend radius can be reduced to 1 mm if nitride thickness is at least 100 nm.

Figure 9:
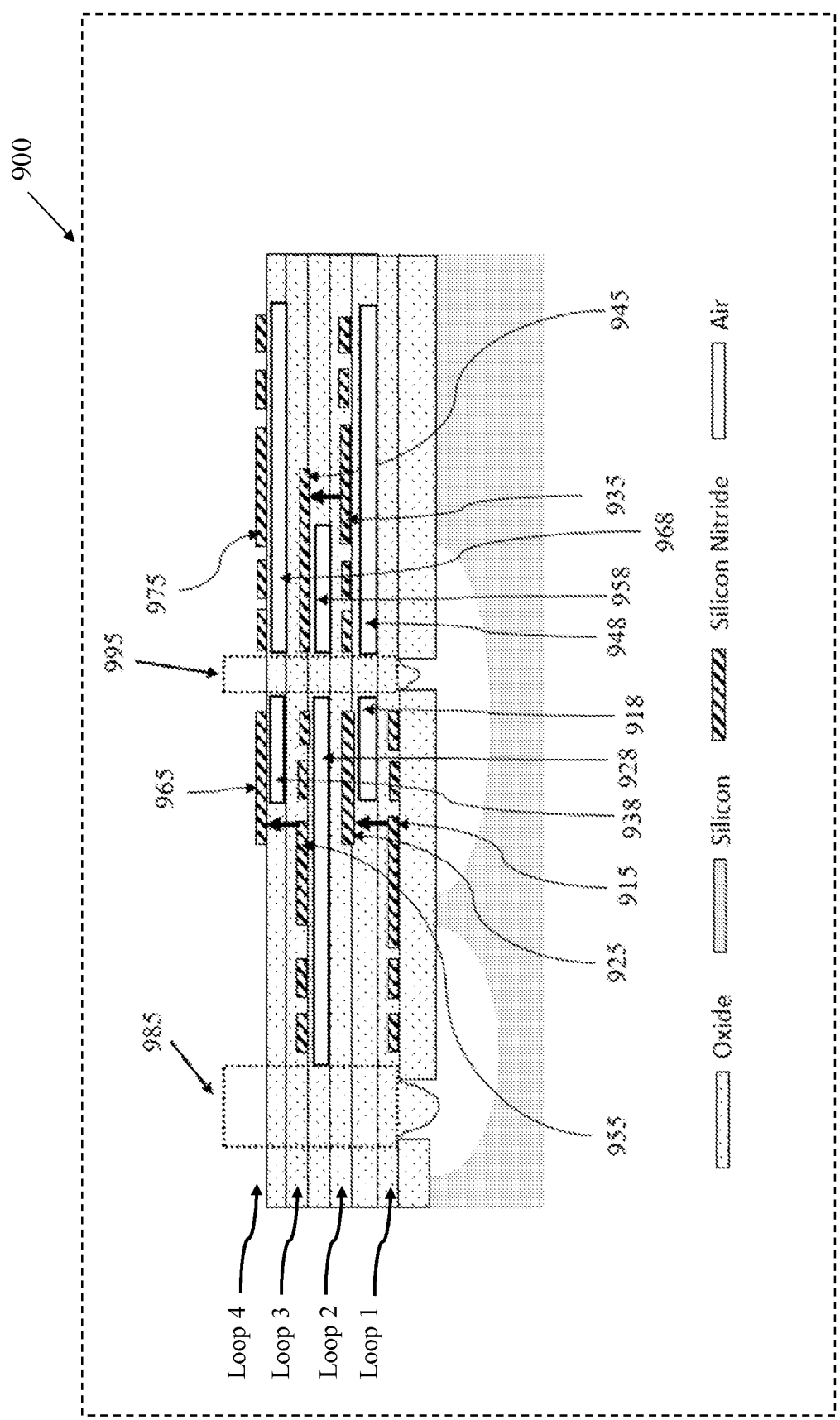
FIG. 9 is the cross-section view of the total the interferometric integrated optic gyroscope of FIG. 8, subsequent to final etching.

Loop 3 in FIGS. 8 and 9, and also shown as 330 in FIG. 3(c), is then deposited in a position shifted back to be disposed vertically above loop 2. With the 1.95 micrometers thick oxide layer between each of loops 1 and 2 and loops 2 and 3, there is a total of 3.9 microns of space between the waveguides of loop 1 and loop 3 with oxide and air cavities between them. This thickness specifically with air gap should be generally sufficient to prevent any coupling there between.

Similarly, the loop 4 in FIGS. 8 and 9, and also shown as 340 in FIG. 3(c), is then deposited in a position shifted back to be disposed vertically above loop 2. With the 1.95 micrometers thick oxide layer between each of loops 2 and 3 and loops 3 and 4, there is a total of 3.9 microns of space between the waveguides of loop 2 and loop 4 with oxide and air cavities between them. This thickness specifically with air gap should be generally sufficient to prevent any coupling there between.

The air claddings 918, 928, 938, 948, 958 and 968 as shown in FIG. 9, in loops 1 to 4, underneath the SiN waveguides, leads to better refractive index contrast, of SiN and air rather than of SiN and oxide. This arrangement can thus generally have improved light confinement than previously described. Using this configuration, thinner oxide layers can also be used, while simultaneously avoiding coupling of light between loops in unwanted areas. This is especially important if the shape of one or more loops is not rectangular, such as with circular loops.

Figure 4:
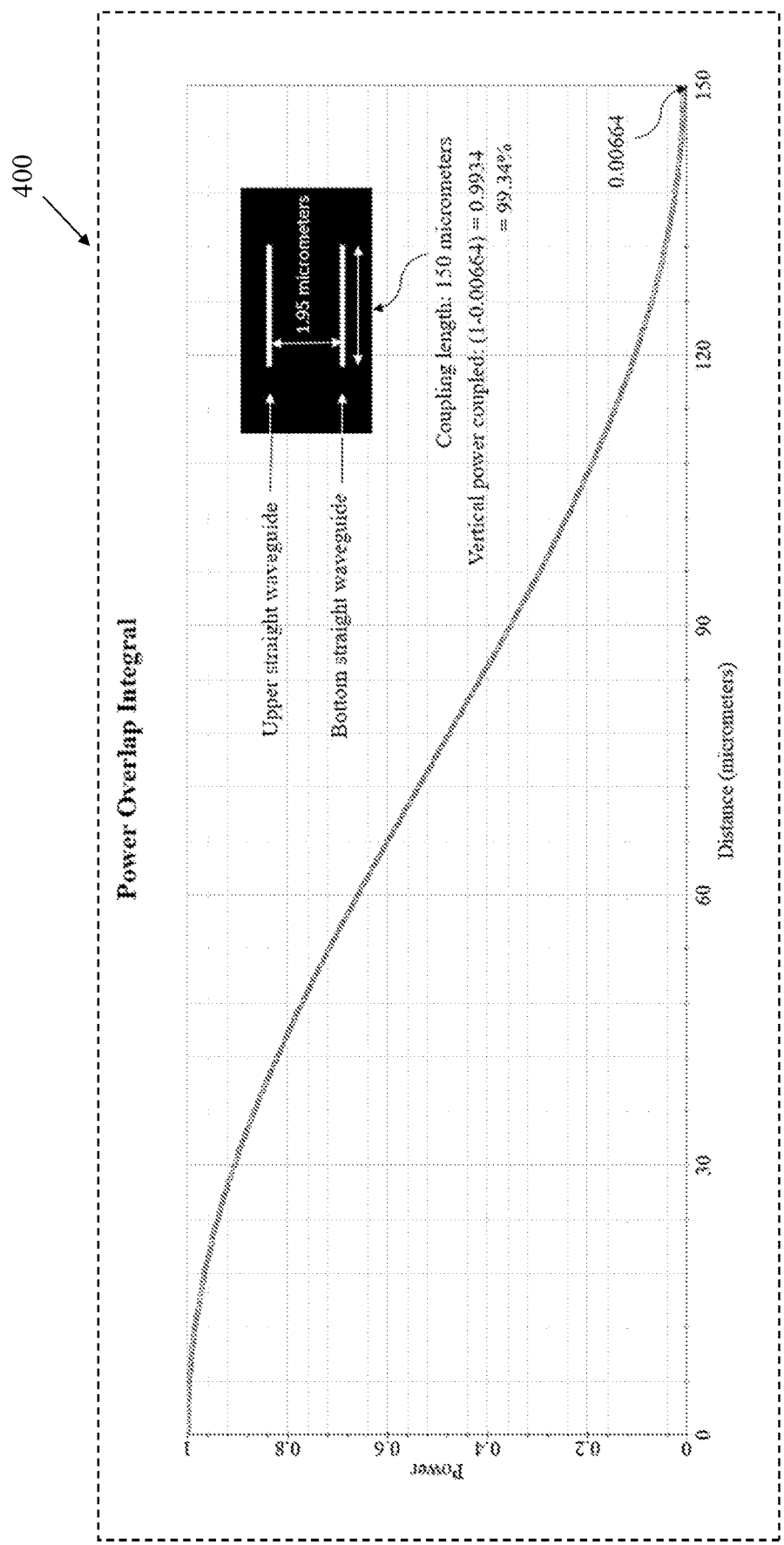
FIG. 4 is simulation of coupling between two vertical couplers of the two loops of the interferometric integrated optic gyroscope of FIG. 3(a) when there is no air cavity below the bottom oxide.

FIG. 4 illustrates the simulation of coupling between two straight waveguides of two loops of the interferometric integrated optic gyroscope of FIGS. 3(*a*) and 3(*b*). In the coupling regions (360 and 370) the light beam from waveguide (310) gets coupled to almost 100%, to be precise 99.34% to the waveguide (320) when the surface-to-surface vertical separation between the two waveguides is 1.95 micrometers and the coupling length is 150 micrometers with no transverse offset between the two waveguides. In the simulation, 0.00664 illustrates the power remained in the bottom waveguide after propagating the coupling distance of 150 micrometers. The refractive index of the silicon nitride is chosen to be 2.08 for this simulation. The two waveguides are straight waveguides. The coupling from bottom straight waveguides to the upper straight waveguides may occur in the coupling regions 360, 370, 380 and 390 as shown in the FIG. 3(*c*) for multiple loops 310, 320, 330 and 340, respectively. Reference to FIG. 8, the coupling from bottom straight waveguides to upper straight waveguides may occur from loop 1 to loop 2 for straight waveguides 815 to 825, from loop 2 to loop 3 for straight waveguides 835 to 845 and from loop 3 to loop 4 for straight waveguides 855 to 865. Similarly for reference to FIG. 9, the coupling from bottom straight waveguide to upper straight waveguide may occur from loop 1 to loop 2 for straight waveguides 915 to 925, from loop 2 to loop 3 for straight waveguides 935 to 945 and from loop 3 to loop 4 for straight waveguides 955 to 965.

The two vertically coupled straight waveguides in FIG. 4, can be replaced by two vertically coupled tapered waveguides as shown in the structure 500 of FIG. 5 which are positioned on top of each other without any transverse offset and with an oxide layer therebetween. The incident light 501 from the bottom tapered waveguide 510 gets coupled to the upper tapered waveguide 520 via the coupling region 530 that gets exited from the output portion of the tapered waveguide (502). The upper tapered waveguides in the coupling regions 360, 370, 380 and 390 as shown in the FIG. 3(*c*) for multiple loops 310, 320, 330 and 320, respectively may be 325, 345, 365 and 385. Reference to FIG. 8, the upper tapered waveguides of loops 1 to 4 may be 825, 845 and 865. Similarly for reference to FIG. 9, the upper tapered waveguides of loops 1 to 4 may be 925, 945 and 965.

FIG. 6 illustrates the simulation of a mode propagating in the bottom tapered waveguide (600) of the interferometric integrated optic gyroscope (110) which is made of a straight waveguide (610) and the tapered waveguide (620). The light beam (601) is launched to the straight waveguide (610) which after propagation in the tapered waveguide (620) gets exited from the output portion of the tapered waveguide (602). The tapered waveguide on the top forming the vertical coupler has not been shown for clarity. Compared to non-tapered waveguide vertical coupler, the optimized tapered waveguide vertical coupler occupies less length. The bottom tapered waveguides in the coupling regions 360, 370, 380 and 390 as shown in the FIG. 3(*c*) for multiple loops 310, 320, 330 and 320, respectively may be 315, 335, 355 and 375. Reference to FIG. 8, the bottom tapered waveguides of loops 1 to 4 may be 815, 835, 855 and 875. Similarly for reference to FIG. 9, the bottom tapered waveguides of loops 1 to 4 may be 915, 935, 955 and 975.

FIG. 7 illustrates the simulation of light in a bottom tapered waveguide coupled to a top tapered waveguide portion of the interferometric integrated optic gyroscope 700 for any two loops. The light beam 701 is launched into the bottom tapered waveguide 710 which after propagating a distance equal to a coupling length gets coupled to the top tapered waveguide 720 and get exited from the output waveguide (702). The coupling from bottom tapered waveguides to the top tapered waveguides may occur in the coupling regions 360, 370, 380 and 390 as shown in the FIG. 3(*c*) for multiple loops 310, 320, 330 and 320, respectively. Reference to FIG. 8, the coupling from bottom tapered waveguide to top tapered waveguide may occur from loop 1 to loop 2 for tapered waveguides 815 to 825, from loop 2 to loop 3 for tapered waveguides 835 to 845 and from loop 3 to loop 4 for tapered waveguides 855 to 865. Similarly for reference to FIG. 9, the coupling from bottom tapered waveguide to top tapered waveguide may occur from loop 1 to loop 2 for tapered waveguides 915 to 925, from loop 2 to loop 3 for tapered waveguides 935 to 945 and from loop 3 to loop 4 for tapered waveguides 955 to 965.

With reference to FIG. 8, a cross-section 800 is illustrated for the above described multiple loops and waveguides with cladding arrangement. Other than below all the vertical coupling regions as shown by boxes with dashed lines 360, 370, 380 and 390 in the corresponding FIG. 3(*c*), the Silicon layers are embedded into oxides as shown by 818, 828, 838, 848, 858 and 868 in FIG. 8.

With reference to FIG. 8, the boxes with dashed lines 885 and 895 represent cavities extending through entire stacks in such way that the Silicon layers are etched away at the same time, creating air cavities below regions, other than below the vertical coupling regions. The cavities, also referred to as trenches, below a bottom silica oxide cladding are created in this embodiment by xenon difluoride (XeF2) gas, isotropically etching silicon in exposed areas through selectively formed openings or passages, also referred to herein as VIAs. For additional details regarding use and fabrications of the VIAs, see for instance U.S. patent application Ser. No. 18/076,069, filed Dec. 6, 2022, the entirety of which is incorporated by reference herein.

FIG. 9 illustrates a cross section 900 of layers after Silicon cavities are etched away. The labels 918, 928, 938, 948, 958 and 968 show the air cavities created after etching through XeF$_2$ gas.

FIGS. 8 and 9 also illustrates the vertical coupling regions between loop 1 and loop 2, loop 2 and loop 3 and loop 3 and loop 4 as shown by the vertical arrows, of the vertically coupled silicon nitride waveguides. Between loop 1 and loop 2 the waveguides 815 and 825 in FIG. 8 or the waveguides 915 and 925 in FIG. 9, between loop 2 and loop 3 the waveguides 835 and 845 in FIG. 8 or the waveguides 935 and 945 in FIG. 9 and between loop 3 and loop 4 the waveguides 855 and 865 in FIG. 8 or the waveguides 955 and 955 in FIG. 9, gets vertically coupled through oxide layers in between. On the other hand, in rest of the regions where the air cavities are created due to the etching through XeF$_2$ gas, there is no vertical coupling due to the air cavities which prevent the enough evanescent fields required for the vertical coupling.

Figure 10:
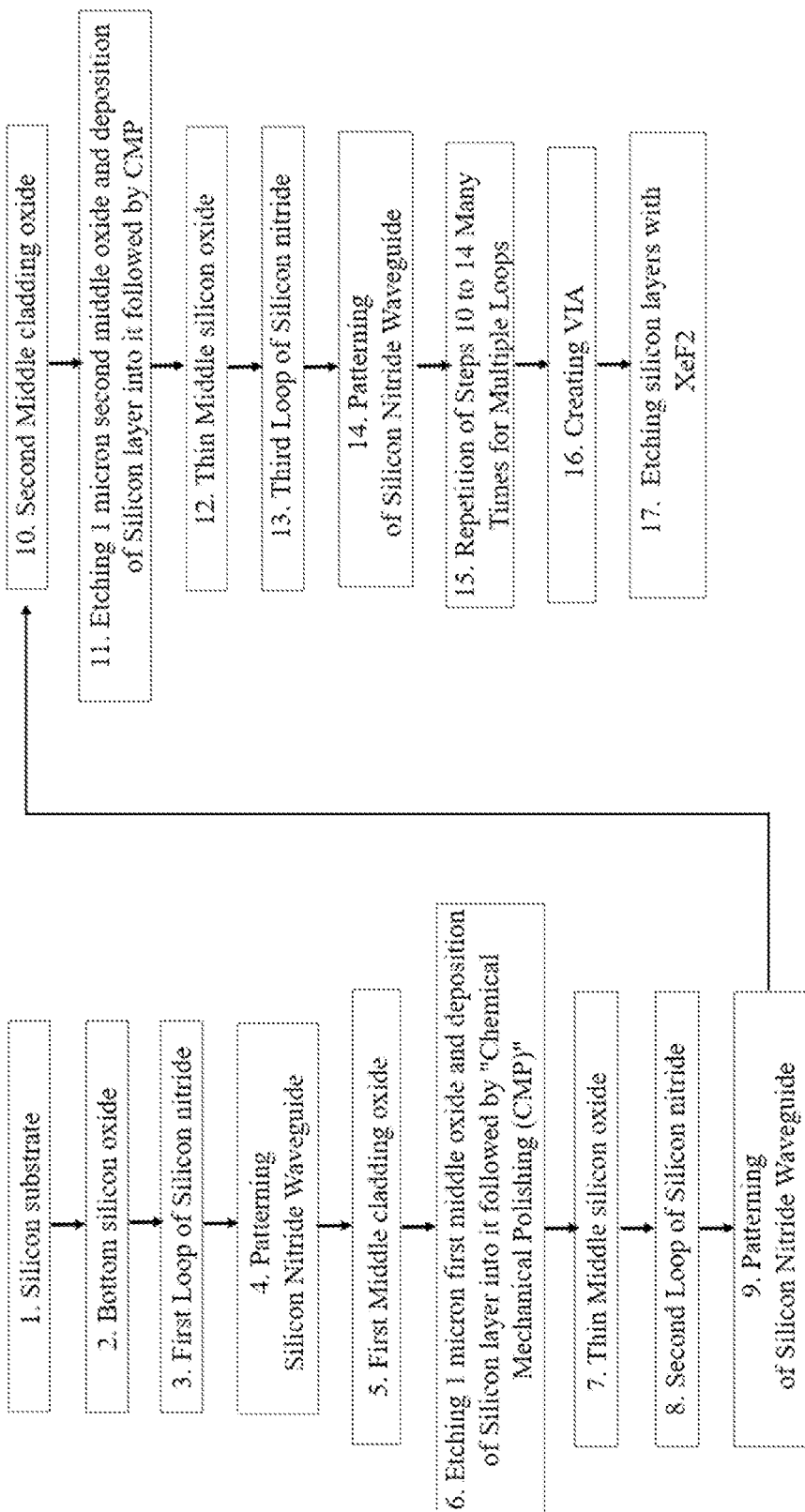
FIG. 10 is a flowchart illustrating a method application to the fabrication of the structures of FIGS. 8 and 9.

FIG. 10 illustrates a flowchart representing a method for fabricating the vertical coupling structure 900 for multiple loops of silicon nitride waveguides.

Modifications and improvements to the above-described embodiments of the present technology may become apparent to those skilled in the art. The foregoing description is intended to be exemplary rather than limiting.

The invention claimed is:

1. An optical waveguide structure for an optical gyroscope, the structure comprising:
    a substrate;
    at least a first silicon nitride waveguide loop and a second silicon nitride waveguide loop connected to the substrate,
    the first silicon nitride waveguide loop and the second silicon nitride waveguide loop being disposed at different vertical distances from the substrate;
    at least one vertical coupler optically coupling the first silicon nitride waveguide loop to the second silicon nitride waveguide loop; and
    a plurality of air cavities defined in material below the first and second silicon nitride waveguide loops,
    no air cavities being defined in regions immediately below a coupling region defined around the at least one vertical coupler.

2. The structure of claim 1, wherein, for the first and second silicon nitride waveguide loops having an about 2.8 um width and an about 100 nm thickness, the first and second silicon nitride waveguide loops are vertically separated by about 1.95 um.

3. The structure of claim 1, further comprising a third silicon nitride waveguide loop connected to the substrate; and
    wherein the first, second, and third silicon nitride waveguide loops are shifted laterally relative to one another to limit vertical coupling outside the coupling region.

4. A method for fabricating the optical waveguide structure of claim 1, the method comprising:
    embedding at least one silicon pocket into the substrate, the substrate being an oxide substrate;
    forming at least one silicon nitride loop on the oxide substrate, at least one layer of oxide cladding being disposed between the at least one silicon pocket and the at least one silicon nitride loop; and
    etching, using XeF2 gas, the at least one silicon pocket to form at least one cavity between the at least one silicon nitride loop and the oxide substrate.

5. The method of claim 4, wherein etching the at least one silicon pocket comprises simultaneously etching through a plurality of layers of silicon deposited on the oxide substrate.

6. A method for fabricating the optical waveguide structure of claim 1, the method comprising:
    depositing at least one oxide layer on the substrate;
    embedding at least one silicon pocket in the at least one oxide layer;
    forming at least one silicon nitride loop on the at least one oxide layer, at least one layer of oxide cladding being disposed between the at least one silicon pocket and the at least one silicon nitride loop, the at least one layer of oxide cladding being formed by a portion of the at least one oxide layer;
    depositing and patterning a layer of photoresist over the at least one silicon nitride loop; and
    etching, via the photoresist, the at least one silicon pocket to form at least one cavity between the substrate and the at least one silicon nitride loop.

7. The method of claim 6, wherein etching, via the photoresist, comprises etching a plurality of openings through at least the at least one oxide cladding layer.

8. The method of claim 7, further comprising depositing at least one cladding overlayer over the at least one silicon nitride loop, the at least one cladding overlayer covering the plurality of openings.

9. The method of claim 6, wherein etching the at least one cavity includes etching using XeF2.

10. The method of claim 8, further comprising:
    a first annealing at 1200 degree Celsius;
    chemical mechanical polishing subsequent to the first annealing; and
    a second annealing subsequent to the chemical mechanical polishing.

* * * * *